United States Patent [19]

Hosoi et al.

[11] Patent Number: 4,616,135

[45] Date of Patent: Oct. 7, 1986

[54] RADIATION IMAGE RECORDING AND REPRODUCING METHOD

[75] Inventors: Yuichi Hosoi; Kenji Takahashi, both of Kaisei, Japan

[73] Assignee: Fuji Photo Film Co., Ltd., Minami-ashigara, Japan

[21] Appl. No.: 647,476

[22] Filed: Sep. 5, 1984

[30] Foreign Application Priority Data

Sep. 6, 1983 [JP] Japan ................................ 58-163877

[51] Int. Cl.$^4$ ............................................ G01T 1/105
[52] U.S. Cl. ................................ 250/327.2; 250/484.1
[58] Field of Search ........................... 250/327.2, 484.1

[56] References Cited

U.S. PATENT DOCUMENTS 4,239,968  12/1980  Kotera et al. ..................... 250/327.2
4,400,619  8/1983  Kotera et al. ..................... 250/327.2

FOREIGN PATENT DOCUMENTS 0077678  4/1983  European Pat. Off. ......... 250/327.2

*Primary Examiner*—Janice A. Howell
*Assistant Examiner*—Constantine Hannaher
*Attorney, Agent, or Firm*—Gerald J. Ferguson, Jr.; Michael P. Hoffman; James E. Bryan

[57] ABSTRACT

A radiation image recording and reproducing method which is improved in efficiency of erasure and comprises steps of:

(i) causing a radiation image storage panel containing a divalent europium activated barium fluorohalide stimulable phosphor to absorb a radiation having passed through an object or having radiated from an object;

(ii) exposing the panel to stimulating rays to release the radiation energy stored therein as light emission;

(iii) detecting the emitted light; and (iv) exposing the panel to light having a wavelength at least within the stimulation wavelength region of the phosphor to erase the radiation energy remaining therein, in which said stimulating rays are electromagnetic waves having a wavelength within the range of 640-900 nm.

3 Claims, 2 Drawing Figures

RADIATION IMAGE RECORDING AND REPRODUCING METHOD

BACKGROUND OF THE INVENTION

1. Field of the Invention

The present invention relates to a radiation image recording and reproducing method, and more particularly, to a radiation image recording and reproducing method utilizing a divalent europium activated barium fluorohalide stimulable phosphor.

2. Description of Prior Art

For obtaining a radiation image, there has been conventionally employed a radiography utilizing a combination of a radiographic film having an emulsion layer containing a photosensitive silver salt material and an intensifying screen. As a method replacing the above-mentioned conventional radiography, a radiation image recording and reproducing method utilizing a stimulable phosphor stated, for instance, in U.S. Pat. No. 4,239,968, has been recently paid much attention. The radiation image recording and reproducing method involves steps of causing the stimulable phosphor to absorb a radiation having passed through an object or having radiated from an object; sequentially exciting (or scanning) the phosphor with an electromagnetic wave such as visible light or infrared rays (stimulating rays) to release the radiation energy stored in the phosphor as light emission (stimulated emission); photoelectrically detecting the emitted light to obtain electric signals; and reproducing the radiation image of the object as a visible image from the electric signals.

In the radiation image recording and reproducing method, a radiation image is obtainable with a sufficient amount of information by applying a radiation to the object at a considerably smaller dose as compared with the conventional radiography. Accordingly, the radiation image recording and reproducing method is of great value, especially when the method is used for medical diagnosis.

A representative example of the stimulable phosphor employable in the radiation image recording and reproducing method is a divalent europium activated barium fluorohalide phosphor ($BaFX:Eu^{2+}$, in which X is at least one element selected from the group consisting of Br, Cl and I), as disclosed in the above-mentioned U.S. Pat. No. 4,239,968. This phosphor gives light emission of high intensity (stimulated emission) and the peak wavelength of the emission is approximately 390 nm, and hence the phosphor is practically very useful. It is also known that the stimulation spectrum of the phosphor shows the maximum emission intensity at a stimulation wavelength of approx. 600 nm. Accordingly, in practicing the radiation image recording and reproducing method utilizing said phosphor, it is proposed that stimulating rays having a wavelength in the vicinity of the peak wavelength in the stimulation spectrum thereof, namely of approx. 600 nm, be employed to enhance the sensitivity of the method, whereby reducing the exposure dose given to the object. For instance, an He-Ne laser beam (wavelength: 633 nm) is described as an example of stimulating rays in the above-mentioned U.S. Pat. No. 4,239,968.

In the radiation image recording and reproducing method, a stimulable phosphor is generally employed in the form of a radiation image storage panel containing it. The radiation image storage panel comprises a support and a phosphor layer containing a stimulable phosphor which is provided on one surface of the support.

It is noted that a radiation image storage panel having stood for a long period of time is apt to cause decrease of quality of an image. There is considered that such decrease occurrs because the stimulable phosphor of the panel absorbs radiations radiating from radioisotopes such as $^{226}Ra$ and $^{40}K$ which is present in the phosphor in a very small amount or environmental radiations and the radiation energy stored therein becomes noises in the resulting image.

The radiation image storage panel employed in the method hardly deteriorates upon exposure to a radiation or to stimulating rays, so that the panel can be used repeatedly for a long period. When the radiation energy stored in the panel as a latent image through exposing the panel to a radiation is released as stimulated emission upon excitation thereof with stimulating rays, only a portion of the stored radiation energy is released and another portion of the radiation energy generally still remains in the panel. Accordingly, the remaining energy causes a noise in the subsequent use of the panel. The noise caused by the radiation energy remaining in the panel has a tendency to markedly appear particularly in the case that a small dose of radiation is applied to the panel in the subsequent use thereof.

For removing (erasing) the radiation energy which causes the noise, it is proposed in U.S. Pat. No. 4,400,619 that light having a wavelength in the stimulation wavelength region of the phosphor is applied to the radiation image storage panel in advance of applying a radiation such as X-rays to the panel in the subsequent use.

Therefore, the stimulable phosphor employed in the above-mentioned radiation image recording and reproducing method is desired not only to give stimulated emission of high intensity but also to show a high efficiency of erasure. In other words, desirable is such a phosphor that difference between the amount of stimulated emission given upon excitation with stimulating rays after exposure to a radiation and the amount of stimulated emission given upon excitation with the stimulating rays after applying the erasing operation thereto is as large as possible.

SUMMARY OF THE INVENTION

An object of the present invention is to provide a radiation image recording and reproducing method utilizing a divalent europium activated barium fluorohalide phosphor ($BaFX:Eu^{2+}$, in which X has the same meaning as defined hereinbefore), which has a high efficiency of erasure and accordingly provides an image of high quality in the repeated use of said panel.

The object is accomplished by the radiation image recording and reproducing method of the present invention comprising steps of:

(i) causing a radiation image storage panel containing a divalent europium activated barium fluorohalide stimulable phosphor to absorb a radiation having passed through an object or having radiated from an object;

(ii) exposing the panel to stimulating rays to release the radiation energy stored therein as light emission;

(iii) detecting the emitted light; and (iv) exposing the panel to light having a wavelength at least within the stimulation wavelength region of the phosphor to erase the radiation energy remaining therein, in which said stimulating rays are electromagnetic waves having a wavelength within the range of 640–900 nm.

As a result of study, the present inventors have discovered that in carrying out the erasing operation by exposing a BaFX:Eu$^{2+}$ phosphor having absorbed and stored radiation energy to light, the radiation energy stored in the trap level capable of being released when exposing the phosphor to stimulating rays having a longer wavelength is more easily erased, and therefore, that the high efficiency of erasure in the method can be achieved in the case of employing as stimulating rays an electromagnetic wave having a wavelength within the range of 640–900 nm, as compared with the case of employing an electromagnetic wave having a wavelength of approx. 600 nm (i.e., a peak wavelength of the stimulation spectrum) which is conventionally proposed. In other words, it has been discovered that the BaFX:Eu$^{2+}$ phosphor shows prominently large difference between the intensity of stimulated emission given immediately after exposure to a radiation such as X-rays and the intensity of stimulated emission given after erasing the remaining radiation energy by exposing the phosphor to a certain amount of light, in the case where the above-mentioned electromagnetic wave having a longer wavelength is employed as stimulating rays, as compared with the case employing an electromagnetic wave having a wavelength of approx. 600 nm.

In the present specification, the efficiency of erasure with respect to a stimulable phosphor for stimulating rays having a given wavelength is represented by a value given by the formula of $I/I_O$. In the formula of $I/I_O$, "$I_O$" means an intensity of stimulated emission of a phosphor (i.e., sensitivity of a panel) given when a radiation image storage panel comprising a BaFX:Eu$^{2+}$ phosphor is excited with stimulating rays after exposure to a certain amount of radiation, and "I" means an intensity of stimulated emission given when the panel is excited with the stimulating rays after exposing the panel to the same amount of radiation and subsequently exposing it to light to erase the radiation energy. Accordingly, the smaller the value of $I/I_O$ is, the larger the difference between the intensity of stimulated emission given immediately after exposure to a radiation and that given after the erasing procedure becomes, that is, the higher the efficiency of erasure becomes.

In the present invention, the difference between the intensity of stimulated emission given immediately after exposure to a radiation and the intensity of stimulated emission given after the erasing procedure can be made larger, as described above, so that the occurrence of noise originating from the energy remaining in the radiation image storage panel after the preceding use (which is to appear in the form of an after-image) can be effectively prevented by subjecting the used panel to the erasing procedure. Accordingly, the method of the present invention can give an image of high quality.

The intensity of stimulated emission of the phosphor decreases in the present invention since an electromagnetic wave having a wavelength within the range of 640–900 nm is employed as stimulating rays. However, such disadvantage is not so serious in the usual radiography, as far as the remarkable enhancement of image quality given in the repeated use of the radiation image storage panel in the method of the present invention is taken into consideration. Further, such decrease of the emission intensity can be compensated by electric amplification, since a radiation image is obtained as electric signals by photoelectrically detecting the stimulated emission in the radiation image recording and reproducing method of the present invention. The decrease of the emission intensity can be also compensated by increasing the intensity of stimulating rays. Therefore, the sensitivity given in the method through such compensation does not so decrease.

In consideration of the above-described advantages and disadvantages, the radiation image recording and reproducing method of the present invention can be effectively utilized particularly in the case where there are a great number of objects and the same radiation image storage panel is employed repeatedly and continuously, for example, in the case of medical mass examination.

From the viewpoints of the efficiency of erasure and the sensitivity, an electromagnetic wave having a wavelength within the range of 670–850 nm is preferably employed in the radiation image recording and reproducing method of the present invention.

DETAILED DESCRIPTION OF THE INVENTION

Figure 1:
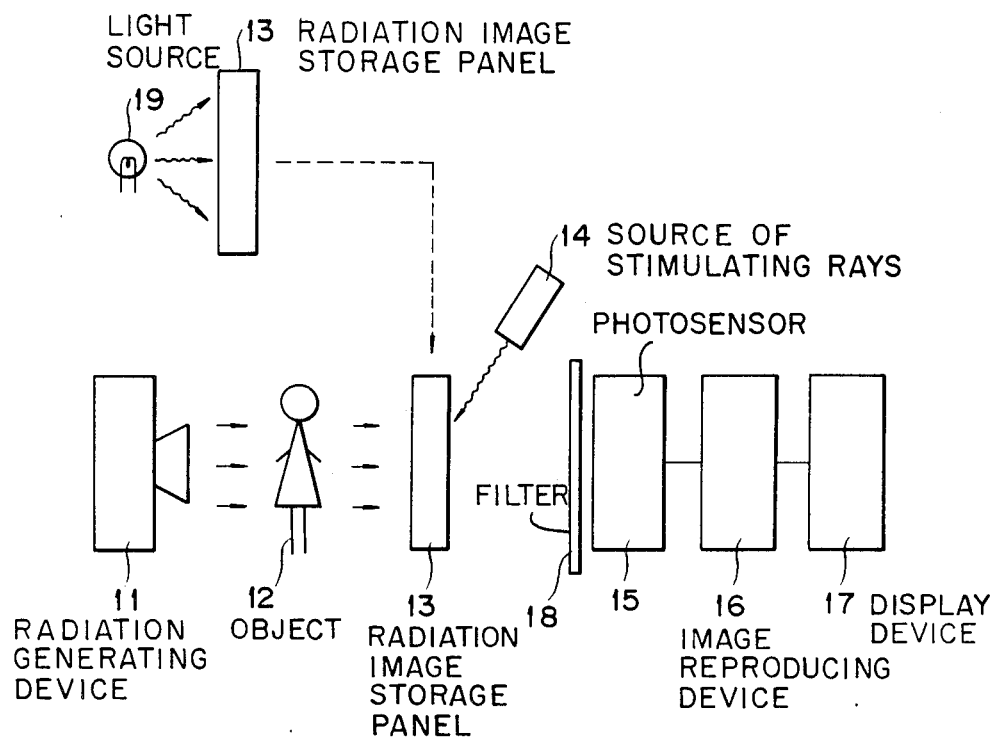
FIG. 1 is a schematic view showing the radiation image recording and reproducing method of the present invention.

The radiation image recording and reproducing method improved in the efficiency of erasure as described above is now described more in detail by referring to a schematic view shown in FIG. 1.

In FIG. 1 which shows the total system of the radiation image recording and reproducing method of the present invention, a radiation generating device 11 such as an X-ray source provides a radiation for irradiating an object 12 therewith; a radiation image storage panel 13 containing the divalent europium activated barium fluorohalide stimulable phosphor absorbs and stores the radiation having passed through the object 12; a source of stimulating rays 14 provides stimulating rays for releasing the radiation energy stored in the panel 13 as light emission; a photosensor 15 detects the light emitted by the panel 13 and converts it to electric signals; an image reproducing device 16 reproduces a radiation image from the electric signals detected by the photosensor 15; a display device 17 displays the reproduced image in the form of a visible image; a filter 18 cuts off the stimulating rays reflected by the panel 13 and allow only the light emitted by the panel 13 to pass through; and a light source 19 gives light for erasing the radiation energy remaining in the panel 13.

FIG. 1 illustrates an example of the system according to the method of the invention employed for obtaining a radiation-transmission image of an object. However, in the case that the object 12 itself emits a radiation, it is unnecessary to install the above-mentioned radiation generating device 11. Further, the devices 15 through 17 in the system can be replaced with other appropriate devices which can reproduce a radiation image having the information of the object 12 from the light emitted by the panel 13.

Referring to FIG. 1, when the object 12 is exposed to a radiation such as X-rays provided by the radiation generating device 11, the radiation passes through the object 12 in proportion to the radiation transmittance of each portion of the object. The radiation having passed through the object 12 impinges upon the radiation image storage panel 13, and is absorbed by the phosphor layer of the panel 13. Thus, a radiation energy-stored image (a kind of latent image) corresponding to the transmission image of the object 12 is formed on the panel 13.

Thereafter, when the radiation image storage panel 13 is exposed to an electromagnetic wave having a wavelength within the range of 640–900 nm, which is provided by the source of stimulating rays 14, the radiation energy-stored image formed on the panel 13 is released as light emission. The intensity of so released light is in proportion to the intensity of the radiation energy which has been absorbed by the phosphor layer of the panel 13. The light signals corresponding to the intensity of the emitted light are converted to electric signals by means of the photosensor 15 such as a photomultiplier. The electric signals are reproduced as an image by the image reproducing device 16, and the reproduced image is displayed by the display device 17. On the other hand, the radiation image storage panel 13 having released the radiation image as the stimulated emission is exposed to the light provided by the light source 19 to erase the radiation energy remaining in the panel 13. This exposure to the light provided by the light source 19 needs to be done at least in advance of the subsequent use of the panel 13.

In the radiation image recording and reproducing method of the present invention, there is no specific limitation on the radiation to be applied to an object to obtain a radiation-transmission image, as far as the above-described phosphor gives stimulated emission upon excitation with the above-mentioned electromagnetic wave after exposure to the radiation. Examples of the radiation employable in the invention include those generally known, such as X-rays, cathode rays and ultraviolet rays. Likewise, there is no specific limitation on the radiation radiating from an object for obtaining a radiation image thereof, as far as the radiation can be absorbed by the above-described phosphor to become an energy source for producing the stimulated emission. Examples of the radiation include $\gamma$-rays, $\alpha$-rays and $\beta$-rays.

As the source of stimulating rays for exciting the phosphor which has absorbed the radiation having passed through or radiated from the object, there can be employed, for instance, light sources providing light having a band spectrum distribution in the wavelength region of 640–900 nm; and light sources providing light having a specific wavelength such as a ruby laser, a semiconductor laser, a glass laser, a YAG laser, Kr gas ion laser, a dye laser and a light emitting diode. Among the above-mentioned sources of stimulating rays, the lasers are preferred because the radiation image storage panel can be exposed thereto with a high energy density per unit area. Particularly preferred is a semiconductor laser, because its size is small, it can be driven by a small electric power, and its power can be easily stabilized by the direct modulation.

As the light source for erasing the radiation energy remaining in the radiation image storage panel, a light source at least providing light of a wavelength within the stimulation wavelength region (within the wavelength region of stimulating rays) of the above-mentioned phosphor is employed. Examples of the light source employable in the method of the present invention include a fluorescent lamp, a tungsten lamp, a halogen lamp, a metal halide lamp, a mercury lamp and a high-pressure sodium lamp as well as the above-mentioned sources of stimulating rays.

The stimulable phosphor employable in the radiation image recording and reproducing method of the present invention will be described hereinafter.

A divalent europium activated barium fluorohalide stimulable phosphor employed in the invention emits light of high intensity (stimulated emission) and the peak wavelength of the emission is approximately 390 nm.

The divalent europium activated barium fluorohalide phosphor (BaFX:Eu$^{2+}$, in which X has the same meaning as defined hereinbefore) can be generally prepared in the following manner. A mixture of starting materials for the phosphor which consists essentially of barium fluoride, barium halide (barium bromide, barium chloride and/or barium iodide) and a trivalent europium compound in the stoichiometric amount is prepared. Then, the mixture of starting materials is fired under a reducing atmosphere. The so fired product is then pulverized and classified, if desired.

In the process for the preparation of the phosphor employed in the invention as described above, the mixing ratio of barium fluoride (BaF$_2$) to barium halide (BaX$_2$) can be varied within the range of 0.85–1.15 (X/Ba, by gram atom). The ratio of X/Ba is preferably within the range of 0.90–1.10. The halogen (X) preferably is Br. The phosphor may contain a small amount of other metal halides, metal oxides or the like to enhance the intensity of stimulated emission. The phosphor may further contain other rare earth elements, transition metals, etc., as a co-activator.

The divalent europium activated barium fluorohalide phosphor is employed in the form of a radiation image storage panel containing thereof in the radiation image recording and reproducing method of the present invention. The panel is substantially composed of a support and a phosphor layer provided thereon comprising a binder and said stimulable phosphor dispersed therein, as described hereinbefore.

The radiation image storage panel having such structure can be prepared, for instance, in the following manner.

In the first place, the above-described stimulable phosphor particles and a binder are added to an appropriate solvent such as a lower alcohol, chlorinated hydrocarbon, ketone, ester or ether, and then they are mixed well to prepare a coating dispersion containing the stimulable phosphor particles homogeneously dispersed in the binder solution.

Representative examples of the binder include proteins such as gelatin and synthetic polymers such as polyvinyl acetate, nitrocellulose, polyurethane, polyvinyl alcohol, linear polyester and polyalkyl(meth)acrylate.

The ratio between the binder and the stimulable phosphor in the coating dispersion is generally within the range of from 1:8 to 1:40 (binder:phosphor, by weight).

Then the coating dispersion is applied evenly to the surface of a support to form a layer of the coating dispersion. The layer of the coating dispersion is heated slowly to dryness so as to complete the formation of a phosphor layer. The thickness of the phosphor layer is generally within the range of 50–500 $\mu$m.

The support material can be selected from those employed for the radiographic intensifying screens in the conventional radiography and those employed in the known radiation image storage panels. Examples of the support material include plastic films such as films of cellulose acetate and polyethylene terephthalate, metal sheet such as aluminum foil, ordinary papers, baryta paper and resin-coated papers.

The surface of the support to receive the phosphor layer may be provided with additional layers such as an adhesive layer, a light-reflecting layer and a light-absorbing layer.

Further, a transparent protective film may be provided on the surface of the phosphor layer not facing the support to physically and chemically protect the phosphor layer. Examples of the material employable for the transparent protective film include cellulose acetate, polymethyl methacrylate, polyethylene terephthalate and polyethylene. The transparent protective film generally has a thickness within the range of approx. 3–20 $\mu$m.

The present invention will be illustrated by the following example, but the example by no means restricts the invention.

EXAMPLE

Barium fluoride, barium bromide and europium oxide were employed to prepare a mixture of starting materials for a phosphor, in which the ratio between barium fluoride and barium bromide (Br/Ba) was 0.97 (by gram atom) and the amount of europium oxide was such that the amount of Eu was 0.001 gram atom for 1 mol of the host material having the Br/Ba ratio of 0.97.

The mixture of starting materials was fired at 900° C. for 2 hours under a nitrogen gas atmosphere containing a small amount of hydrogen gas (first firing). After the firing was complete, the so fired product was allowed to stand for cooling and pulverized. Subsequently, the pulverized mixture was again fired at 600° C. for 2 hours under the same atmosphere as employed in the first firing stage (second firing). After the second firing was complete, the fired product was allowed to stand for cooling and pulverized to obtain a powdery divalent europium activated barium fluorobromide phosphor.

A radiation image storage panel was prepared by using the obtained phosphor as follows.

To a mixture of the phosphor particles and a linear polyester resin was added successively methyl ethyl ketone and nitrocellulose (nitrification degree: 11.5%), to prepare a dispersion containing the phosphor particles. Subsequently, tricresyl phosphate (plastisizer), n-butanol and methyl ethyl ketone were added to the dispersion. The mixture was sufficiently stirred by means of a propeller agitator to obtain a homogeneous coating dispersion having a mixing ratio of 1:20 (binder:phosphor, by weight) and a viscosity of 25–35 PS (at 25° C.).

The coating dispersion was applied to a polyethylene terephthalate sheet containing carbon black (support, thickness: 250 $\mu$m) placed horizontally on a glass plate. The application of the coating dispersion was carried out using a doctor blade. The support having a layer of the coating dispersion was then placed in an oven and heated to dryness at a temperature gradually rising from 25° to 100° C. Thus, a phosphor layer having a thickness of 200 $\mu$m was formed on the support.

On the phosphor layer was placed a transparent polyethylene terephthalate film (thickness: 12 $\mu$m; provided with a polyester adhesive layer on one surface) to combine the transparent film and the phosphor layer with the adhesive layer. Thus, a radiation image storage panel consisting essentially of a support, a phosphor layer and a transparent protective film was prepared.

Thus prepared radiation image storage panel was evaluated on the sensitivity and the efficiency of erasure under variation of the wavelength of stimulating rays as described below.

The radiation image storage panel was exposed to X-rays (voltage: 80 KVp, amperage: 400 mA) for 0.5 sec. at a distance of 70 cm. The panel was immediately scanned with a light emitting diode (wavelength: 728 nm) having an energy intensity of $1.8 \times 10^{-4}$ J/cm$^2$ to excite the phosphor contained therein and measured on the intensity of stimulated emission $I_O$ (i.e., sensitivity) at the wavelength of 390 nm. Independently, the panel was exposed to X-rays at the same dose at the same distance as employed above, and then exposed to light of $1 \times 10^5$ lux for 150 sec. by means of a white fluorescent lamp to erase the X-ray energy stored in the panel. Subsequently, the panel was measured on the intensity of stimulated emission I in the same manner. The ratio of the intensity of stimulated emission I given after the erasing procedure to the intensity of stimulated emission $I_O$ given before the erasing procedure, namely $I/I_O$, was calculated.

The above-described procedures were repeated except that light emitting diodes having a wavelength of 783 nm and 835 nm respectively were employed as the stimulating rays instead of the above diode, to measure $I_O$ and I and to calculate the ratio of $I/I_O$.

Further, for comparison, $I_O$ and I were measured to calculate the ratio of $I/I_O$ in the same manner as described above except that monochromatic light (wavelength: 633 nm) obtained through a spectroscope by using a halogen lamp as a source was employed as the stimulating rays.

Figure 2:
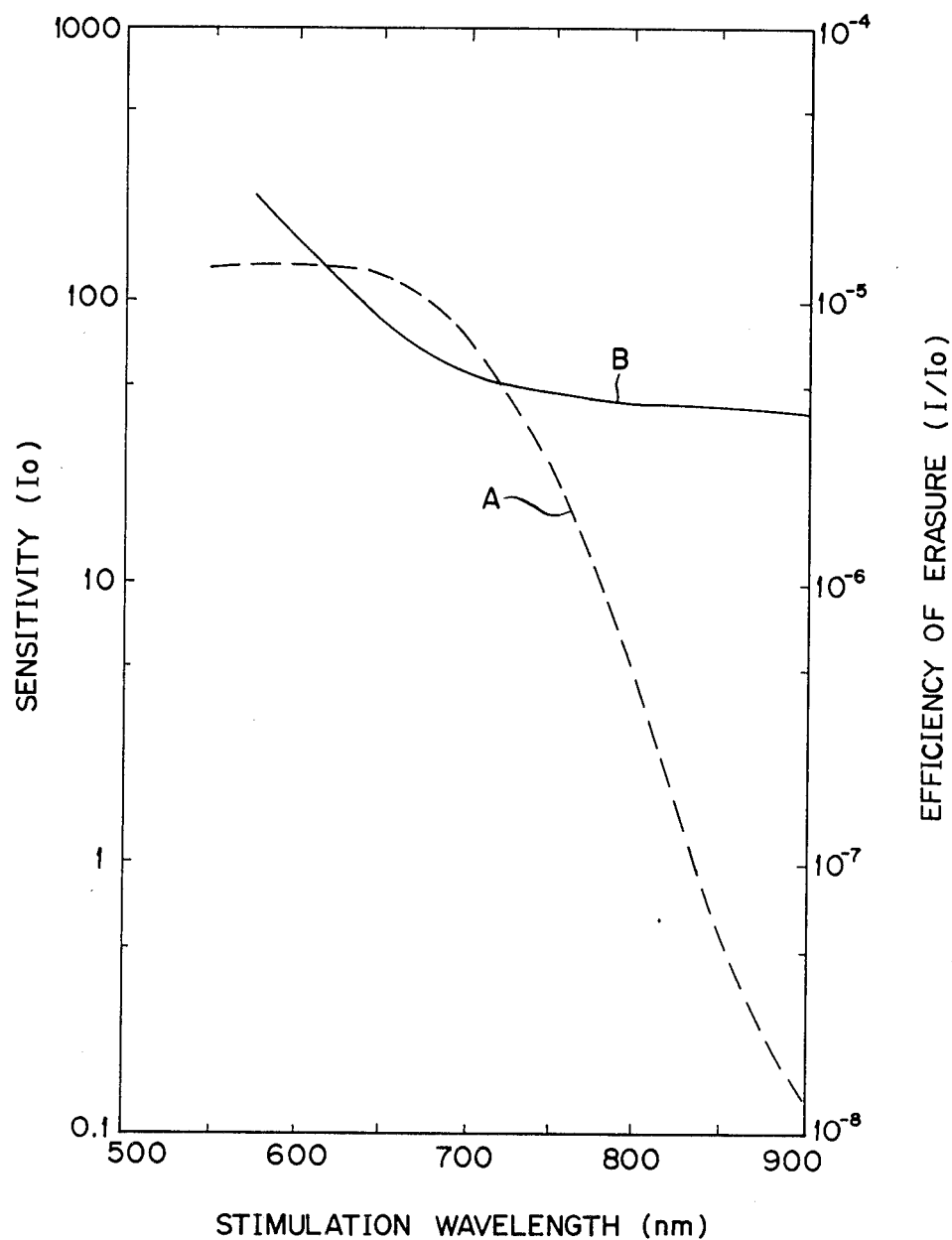
FIG. 2 illustrates graphs showing a relationship between a stimulation wavelength and a sensitivity (Curve A) and a relationship between a stimulation wavelength and an efficiency of erasure in the radiation image recording and reproducing method of the present invention employing a BaFBr:Eu$^{2+}$ phosphor (Curve B).

The results are graphically shown in FIG. 2.

FIG. 2 illustrates a graph showing a relationship between a stimulation wavelength (i.e., a wavelength of stimulating rays) and a sensitivity ($I_O$) (Curve A), and a relationship between a stimulation wavelength and an efficiency of erasure ($I/I_O$) (Curve B) in the radiation image storage panel of the Example.

As is evident from FIG. 2, the efficiency of erasure increases, that is the value of $I/I_O$ decreases, as the wavelength of stimulating rays is made longer. Accordingly, the efficiency of erasure is more enhanced in the case of using stimulating rays having the longer wavelength than that in the case that stimulating rays having a wavelength of 633 nm are employed as proposed previously. On the other hand, the sensitivity ($I_O$) decreases as the wavelength of stimulating rays is made longer.

In the radiation image recording and reproducing method of the present invention, the restriction on the wavelength is made to a range of 640–900 nm, in consideration of the relationship between the stimulation wavelength and sensitivity as well as the relationship between the stimulation wavelength and efficiency of erasure. Particularly, an electromagnetic wave in the wavelength region of 670–850 nm is preferably employed as stimulating rays in the method of the invention. It is evident from FIG. 2 that by using stimulating rays having a wavelength within said wavelength region, the efficiency of erasure is enhanced to more than twice as much as that obtained by using stimulating rays having a wavelength of 633 nm, and the decrease of sensitivity is kept at a level within decrease of about two orders.

The radiation image recording and reproducing method of the present invention was described above with respect to the example using a radiation image storage panel utilizing a BaFBr:$Eu^{2+}$ phosphor. It has been confirmed that the same result as described above is also obtained in the case of using a radiation image storage panel utilizing another BaFX:$Eu^{2+}$ phosphor such as BaFCl:$Eu^{2+}$ phosphor, a BaFI:$Eu^{2+}$ phosphor or the like.

We claim:

1. A radiation image recording and reproducing method comprising steps of:
   (i) causing a radiation image storage panel containing a divalent europium activated barium fluorohalide stimulable phosphor to absorb a radiation having passed through an object or having radiated from an object;
   (ii) exposing the panel to stimulating rays to release the radiation energy stored therein as light emission;
   (iii) detecting the emitted light; and
   (iv) exposing the panel to light having a wavelength at least within the stimulation wavelength region of the phosphor to erase the radiation energy remaining therein,
   in which said stimulating rays are electromagnetic waves having a wavelength within the range of 670–850 nm.

2. The radiation image recording and reproducing method as claimed in claim 1, in which said steps (i) to (iv) are repeated continuously.

3. The radiation image recording and reproducing method as claimed in claim 1, in which said electromagnetic wave is a semiconductor laser beam.

* * * * *